United States Patent [19]
Krojer

[11] 4,047,911
[45] Sept. 13, 1977

[54] AIR INTAKE WITH DEFLECTING DEVICE AGAINST FOREIGN OBJECTS IMPINGING IN THE INITIAL DIRECTION OF AIR FLOW AT ENGINE NACELLES

[75] Inventor: Hubert Krojer, Kippenhausen, Germany

[73] Assignee: Dornier GmbH, Germany

[21] Appl. No.: 537,447

[22] Filed: Dec. 30, 1974

Related U.S. Application Data

[63] Continuation of Ser. No. 440,576, Feb. 7, 1974, abandoned.

[30] Foreign Application Priority Data

Apr. 12, 1973 Germany .............................. 2318380

[51] Int. Cl.² ............................................. B01D 46/00
[52] U.S. Cl. ....................................... 55/306; 55/434; 244/53 B
[58] Field of Search ................. 55/306, 422, 434, 502; 60/39.09 P; 244/53 B

[56] References Cited

U.S. PATENT DOCUMENTS

| 2,474,068 | 6/1949 | Sammons et al. | 60/39.09 P |
| 3,347,496 | 10/1967 | Opfer, Jr. | 244/53 B |
| 3,534,548 | 10/1970 | Connors | 55/306 X |
| 3,667,703 | 6/1972 | Bock | 244/53 B |
| 3,710,560 | 1/1973 | Maddocks | 55/502 X |

FOREIGN PATENT DOCUMENTS

673,987   6/1952   United Kingdom .............. 244/53 B

Primary Examiner—Frank W. Lutter
Assistant Examiner—Kathleen J. Prunner
Attorney, Agent, or Firm—James E. Bryan

[57] ABSTRACT

An improvement in an air intake for an aircraft engine, particularly a prop-jet engine, which intake is ring-shaped at the forward part thereof and has a central, non-rotatable body mounted in said intake, which together form an intake diffuser, the improvement comprising a displaceable inlet lip on said intake, said lip being displaceable to sealing contact against said central body and against the direction of air onflow, and said lip in said sealing contact position forming a ring-shaped inlet gap behind said lip.

5 Claims, 4 Drawing Figures

AIR INTAKE WITH DEFLECTING DEVICE AGAINST FOREIGN OBJECTS IMPINGING IN THE INITIAL DIRECTION OF AIR FLOW AT ENGINE NACELLES

This is a continuation of application Ser. No. 440,576, filed Feb. 7, 1974 and now abandoned.

The present invention relates to an air intake with a deflecting device against foreign objects impinging in the initial direction of air flow at engine nacelles, which device is actuatable by the pilot primarily during the take-off and landing phases depending upon the need therefor. During the take-off and landing phases of airplanes on water or on unpaved airports, foreign objects, such as dust, rocks, and/or water particles, are whirled up, and pass into the engine, partly through the air intake. This phenomenon arises particularly in the case of flying boats or seaplanes operating on the high seas which produce, during the take-off and landing phases in heavy seas, water fountains that can pass directly into the air intake of the engine. These water fountains are generated by the forward part of the boat so that the water particles penetrate in an almost horizontal direction into the funnel-shaped inlets of the engines mounted in the central fuselage area or region. The ingestion into the engine of larger amounts of water results in a significant power drop and, under certain circumstances, even the failure of the engine to operate.

Similar conditions arise during take-offs and landings on unpaved airports. The nose wheel engine mounted in most types of airplanes in the forward fuselage part whirls up, when driving over such upaved airports, dust and/or rocks which, accordingly, will also impinge or strike almost horizontally against the air intake of the engine. These foreign objects that penetrate into the engine cause damage, as a result of which the engine may fail.

Known constructions of airplanes have engine arrangements in which the engine is mounted above the wing and, accordingly, is accommodated in a less critical region. In extreme cases, such as frequently occurs, for example, in flying boats in the manner described hereinabove, this mounting is not sufficient since the water fountains frequently extend higher than the entire flying boat height.

Also proposed in the art have been filters, water separators, and the like, which are mounted, however, predominantly in the shrouds of piston engines. This embodiment is therefore not suitable for annular air intakes such as are found, for example, in propeller turbines.

It is the object of the present invention to provide a deflecting device against foreign objects at ring-shaped air intakes for engines which prevents principally the foreign objects and/or flying water from penetrating into the engine.

This object is obtained, according to the present invention, by virtue of the fact that the inlet lip is displaceable up to sealing contact at the central body against the initial directions of air flow and, at the rearward portion thereof, has an arched part directed against the direction of the initial air flow in such a manner that, in the pushed-forward position, a ring-shaped inlet or intake gap is formed behind the intake lip having an orifice pointing away from the normal initial direction of air flow.

According to a further embodiment of the present invention, the sealing stop of the ring-shaped inlet lip against the inner diffuser part is formed of an elastic material, for example rubber, being secured to the inlet lip.

Furthermore, the radially circumferential gap is provided with an equally circumferential air-guiding sheet metal element coordinated to the gap cross-section. For the purpose of the axial actuation of the ring-shaped inlet lip, there are mounted within the engine housing, for example, three hydraulic cylinders which are offset with respect to each other about 120° at the circumference.

This aforementioned construction of an air intake which is closable in the axial direction repels or deflects the foreign objects arriving in the axial direction relative to the engine. The air entry to the compressor takes place by way of the radially circumferential gap. The foreign objects repelled or deflected by the inlet lip move, on the basis of their kinetic energy and direction of movement, past the radially circumferential gap. The construction proposed in German Pat. No. 1,140,779 comprises additional inlet openings which are created by axial displacement of the inlet lip. In that construction, the air intake or air inlet is not closed in the axial direction of onflow so that the object sought to be obtained by the present invention is not solved by this aforementioned patent.

The inventive air intake or air inlet with the inventive deflecting device will now be further described hereinbelow on the basis of the accompanying drawings, wherein FIG. 1a is a cross-sectional view through an air inlet or air intake with an open deflecting device;

Figure 1A:
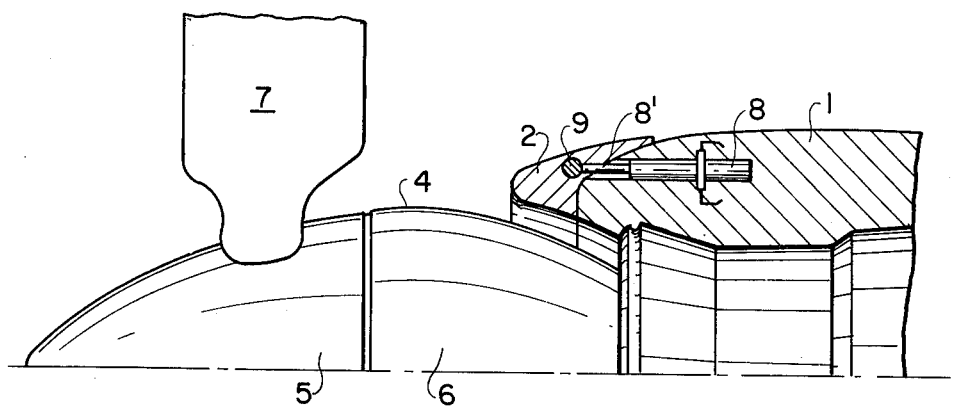
FIG. 1b is a cross-sectional view through an air inlet or air intake with a closed deflecting device.
Figure 1B:
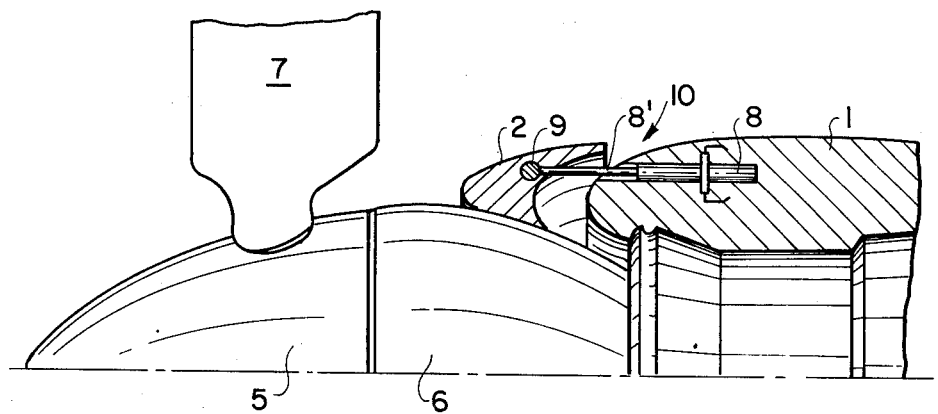

FIGS. 1a and 1b include individually an engine nacelle 1 of a propeller turbine and mounted at the front thereof in an axially displaceable manner is a ring-shaped inlet lip 2 having a concave inner surface, with the nacelle 1 constituting together with the inlet lip 2 the outer part of an inlet diffuser which is conventional per se, while the inner part of the inlet or intake diffuser 4 is formed of a non-rotating gear unit sheathing 6 having a convex outer surface mounted adjacent the spinner 5. The propeller foot 7 has been represented for the sake of clarity. In the housing 1 are hydraulic cylinders 8, arranged offset with respect to each other in each case about 120°, at the circumference of the air intake, and they serve for the axial displacement of the inlet lip 2. The central axis of the engine has been represented in a dash-dotted line. FIG. 1a illustrates the position of the inlet lip 2 during the flight and/or in flight phases during which no foreign objects or the occurrence of flight water need be expected. The inlet lip 2 is matched in the position mentioned to the shape of the engine nacelle 1 so that a conventional ring-shaped air intake or air inlet is formed.

In FIG. 1b, the inlet lip 2 is displaced in the axial direction up to sealing contact with the inner part of the inlet diffuser 4 and, in the present example, with the gear unit sheathing 6. This displacement of the inlet lip 2 in the axial direction is effected by means of the aforementioned hydraulic cylinders 8 which are operated, by remote control, by the pilot. Because of, or by virtue of, this displacement of the inlet lip 2 away from the engine housing 1, a ring-shaped gap 10 is formed whose cross-section has a curvature positioned against the initial direction of air flow against the engine nacelle 1. This means that the combustion air is drawn in almost against the onflow of the air surrounding the engine nacelle 1. The axially-displaced inlet lip 2 thus prevents on the one hand that frontally impinging foreign objects get into the air intake and, on the other hand, assures that foreign objects striking upon the inlet lip 2 will not reach the ring-shaped gap 10, because of their kinetic energy and direction of movement, and thus will not pass into the engine. In case of a strong incidence of foreign objects and/or water spray, the pilot has the possibility to protect the engine thereagainst at any time with the aforementioned deflecting device.

Figure 2A:
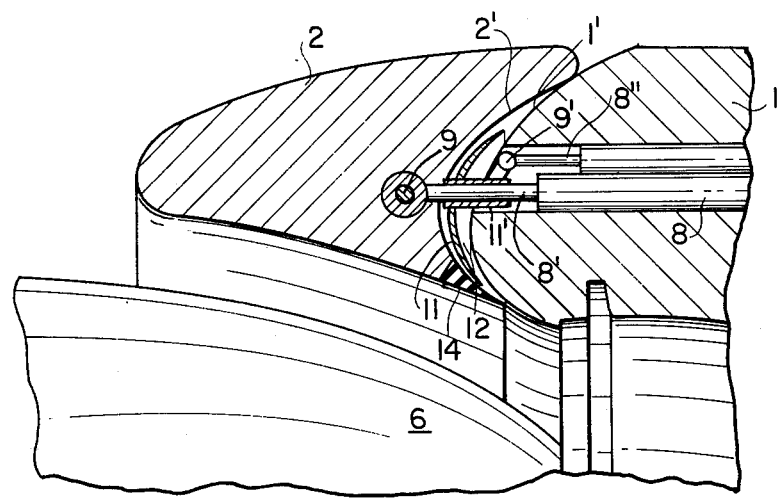
FIG. 2a illustrates, in a cross-sectional view, the arrangement of an air-guiding sheet metal portion and of an elastic sealing lip in the normal flight attitude.
Figure 2B:
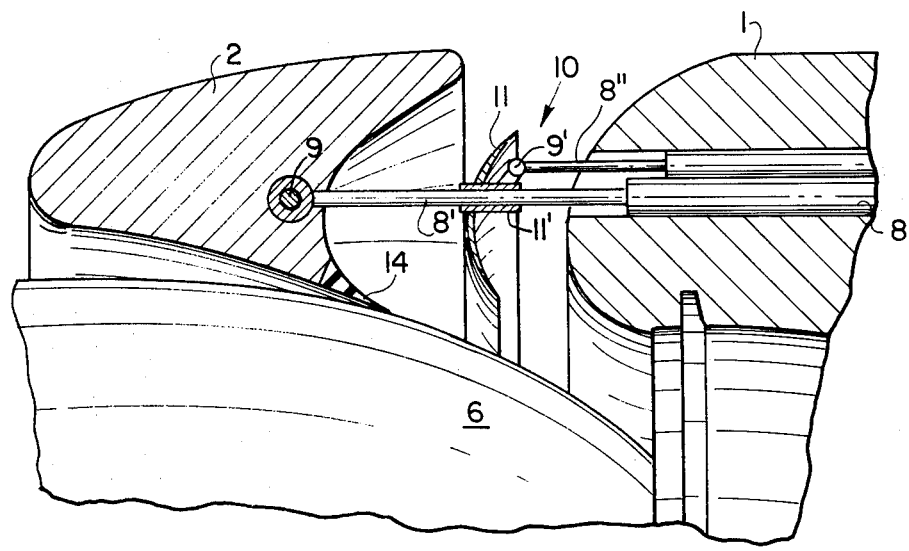
FIG. 2b illustrates the arrangement of an air-guiding sheet metal portion in the radial gap as well as an elastic sealing lip in a cross-sectional view during the take-off and landing phases.

FIGS. 2a and 2b illustrate an air-guiding sheet metal member mounted between the inlet lip 2 and the engine housing 1 on the sliding bearing 11' on the actuating rod 8' of the hydraulic cylinder 8, the actuating rod 8' being secured to the lip 2 by the joint 9.

The sheet metal member is accommodated within a cavity 12 formed by the inlet lip 2 making contact with the engine nacelle 1, as shown in FIG. 2a. This cavity 12 is formed by the differently arched walls 2' and 1' delimiting the gap 10. The air-guiding sheet metal member is hingedly connected at the joint 9' to a further actuating rod 8" of a second hydraulic cylinder in the axial direction and is thereby guided into and fixed in the corresponding positions with the retracted and/or extended inlet lip 2. Furthermore, the inlet lip 2 is provided at the inside diameter thereof, at the transition to the inner nacelle contour, with a sealing strip 14 of elastic material. This sealing strip 14 will be sealingly positioned in the extended position of the sealing lip about the gear unit sheathing 6, as has been shown in FIG. 2b. Further shown in FIG. 2b is the air-guiding sheet metal member 11 within the gap 10. The air-guiding sheet metal member 11 serves for a better deflection and more uniform distribution of the combustion air. With this aforementioned arrangement of a deflecting device at engine inlets against foreign objects and/or water spray, the pilot is able at any time to protect the engine against objects originating from the surroundings of the airplane which could be damaging to the engine.

It will be obvious to those skilled in the art that many modifications may be made within the scope of the present invention without departing from the spirit thereof, and the invention includes all such modifications.

What is claimed is:

1. In an air intake for an aircraft engine, particularly a prop-jet engine, which intake is annular at the forward part thereof and has a central, non-rotatable body with a convex surface mounted in said intake,
   the improvement which comprises displaceable annular inlet lip means, having a concave inner surface, on said intake,
   said lip means being diplaceable to sealing contact against said central body and against the direction of air onflow, whereby a first air inflow channel is closed to air and a second air inflow channel behind said lip means is opened to air, said latter channel having an opening pointing away from the direction of air onflow.

2. An air intake according to claim 1 including hydraulic means for displacing said lip means.

3. An air intake according to claim 1 including resilient sealing strip means on said lip means where said lip means contacts said central body.

4. An air intake according to claim 1 including hydraulic cylinder and piston rod means for displacing said lip means and curved air-guiding means mounted on said piston rod by sliding bearing means.

5. An air intake according to claim 4 including second hydraulic cylinder and piston rod means for displacing said air-guiding means.

* * * * *